Oct. 18, 1932.  G. D. ANGLE  1,882,716
OIL SPRAY VALVE FOR LUBRICATION AND COOLING
Filed July 9, 1928
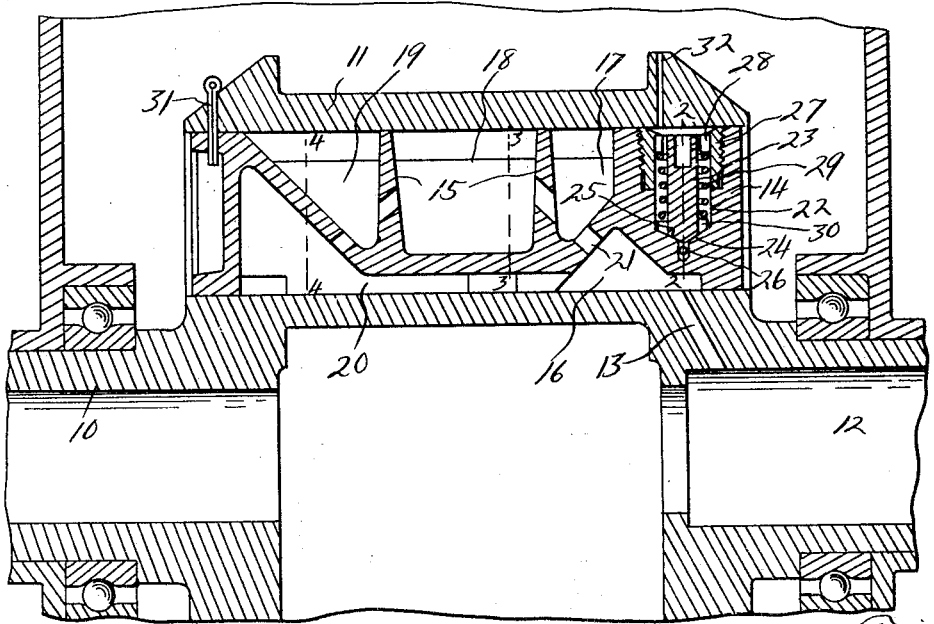
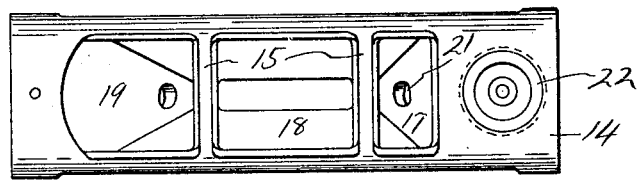
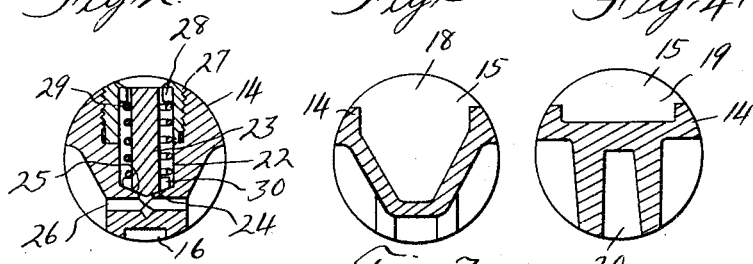
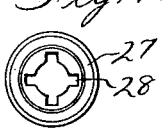
Inventor
Glenn D. Angle Patented Oct. 18, 1932

1,882,716

UNITED STATES PATENT OFFICE

GLENN D. ANGLE, OF CINCINNATI, OHIO, ASSIGNOR TO THE LE BLOND AIRCRAFT ENGINE CORPORATION, OF CINCINNATI, OHIO, A CORPORATION OF OHIO

OIL SPRAY VALVE FOR LUBRICATION AND COOLING

Application filed July 9, 1928. Serial No. 291,408.

This invention relates to engines and refers more particularly to an improved means for lubricating and cooling internal combustion engines preferably of the radial type commonly used in aircraft design.

It is one of the primary objects of this invention to provide means operable at a predetermined speed of the engine for controlling the escape of oil into the crank chamber.

A further object of the present invention is to associate an oil spray valve with any suitable rotating part of the engine so that the valve will be operated by the centrifugal force of the rotating part to regulate the spray of oil within the crank chamber.

A still further object of the invention resides in the novel means employed for mounting the valve and trapping the dirt in the oil prior to spraying the latter within the crank chamber. The arrangement being such as to facilitate assembly and permit economical manufacture.

Other objects and novel features of construction of this invention will be made more apparent as this description proceeds especially when considered in connection with the accompanying drawing wherein:

Figure 1 is a transverse sectional view through a crank pin showing my invention applied thereto;

Figure 2 is a sectional view taken on the plane indicated by the line 2—2 of Figure 1;

Figure 3 is a sectional view taken on the plane indicated by the line 3—3 of Figure 1;

Figure 4 is a sectional view taken on the plane indicated by the line 4—4 of Figure 1;

Figure 5 is a plan view of the plug;

Figure 6 is an end elevation of the valve;

Figure 7 is an end elevation of the retainer for the valve.

While it will be apparent as this description proceeds, that the present invention is capable of numerous and diversified uses, nevertheless for the purpose of illustration I have herein shown this invention as used in connection with radial motors. In this connection I have illustrated fragmentarily a crank shaft 10 having a hollow crank pin 11 communicating with a recess 12 in the shaft by means of a lubricant passage 13.

Sleeved within the hollow crank pin 11 is a plug 14 preferably formed of cast metal and having a series of partitions 15 therein dividing the same into a plurality of oil receiving chambers 16, 17, 18, 19 and 20. The partitions 15 being apertured as at 21 for establishing communication between the chambers aforesaid. The plug 14 is also provided with a bore 22 adjacent one end thereof for receiving a suitable valve 23. The latter is preferably provided with a tapped portion 24 adapted to engage a correspondingly shaped seat 25 formed upon the bottom wall of the bore 22. Extending transversely of the bore 22 and communicating with the seat portion 25 thereof is a restricted passage 26. As shown particularly in Figure 2 of the drawing the passage 26 communicates with the oil receiving chamber 16.

In order to retain the valve 23 in the bore 22 I provide a retainer 27 threadedly engaging the bore 22 and having a series of spaced inwardly projecting lugs 28 constituting an abutment for the spring 29 and engageable with the valve to guide the same to its seat. The spring 29 preferably surrounds the valve and rests at the lower end upon the lugs 30 projecting outwardly from the valve adjacent the lower end thereof. The lugs 30 are arranged in spaced relation to each other similar to the lugs 29 and are adapted to engage the walls of the bore 22 below the member 27. The arrangement is such that the valve is not only yieldably urged against its seat but is accurately guided relative thereto. Any suitable means may be employed for locking the plug relative to the crank pin herein shown as a cotter pin 31, extending through aligned apertures in the crank pin and plug. The crank pin is further provided with a restricted aperture 32 arranged in communication with the bore 22 so as to permit the oil to escape into the crank chamber.

From the foregoing it will be apparent that the valve is so mounted as to be centrifugally operated and accordingly will lift from its seat at a predetermined speed of the engine. Furthermore due to the fact that the retaining member 27 is threadedly mounted within the bore 22, a range of adjustment is provided sufficient to meet any practical conditions.

Referring now to the operation of the device it will be noted that oil from the pressure line is admitted into the chamber 16 through the port 13 and permitted to flow within the chambers 17, 18, 19 and 20 which operate as a reservoir for the oil and incidentally traps the dirt therein. Assuming now that the engine is operated at a comparatively high rate of speed, the centrifugal force of the crank pin will overcome the action of the spring 29 and unseat the valve 23. The oil in the chamber 16 will then flow through the passage 26 and bore 22 and be sprayed out through the restricted opening 32 into the crank chamber.

Thus from the foregoing it will be noted that I have provided a valve assembly operable only upon a certain predetermined speed of the crankshaft to spray a comparatively larger quantity of oil into the crank chamber for insuring proper lubrication and cooling of the working parts. Moreover due to the fact that the valve is operated to open position solely by centrifugal force the spray of oil will be normal at low engine speeds and will not exceed the seepage from the ends of the bearing. Thus overoiling and fouling of the spark plugs is reduced to the minimum.

While in describing the present invention, particular stress has been placed upon the association of the valve with the hollow crank pin of the engine, it should be understood that the centrifugal force of any suitable rotating part of the engine may be utilized to regulate the spray valve. This is especially true in an aircraft engine fitted with a propeller where the load variation bears a direct relationship to the speed.

What I claim as my invention is:

1. In an internal combustion engine, the combination with a crank chamber, of a crank shaft within said chamber, and means communicating with a lubricant supply operable only at a predetermined speed of the shaft to spray lubricant within said chamber.

2. In combination, a crank chamber, a crank shaft, and a valve associated with said crank shaft and communicating with a lubricant supply, said valve operable at a predetermined speed of the crank shaft to permit lubricant to escape into said chamber.

3. In combination, a crank chamber, a crank shaft within said chamber, and a valve communicating with a lubricant supply and operable by the centrifugal force of the crank shaft to distribute lubricant into said chamber.

4. In combination, a crank chamber, a crank shaft within said chamber, and a centrifugally actuated valve communicating with a lubricant supply and operable at a predetermined speed of the shaft to distribute lubricant within said chamber.

5. In combination, a crank chamber, a crank shaft having a crank pin disposed within said chamber, and means associated with said crank pin and communicating with a lubricant supply, said means operable only at a predetermined speed of the shaft to distribute lubricant into said chamber.

6. In combination, a crank chamber, a crank shaft having a hollow crank pin, and a centrifugally actuated valve disposed within said pin and communicating with a lubricant supply, said valve being operable at a predetermined speed of the shaft to permit the lubricant in said supply to escape into the chamber.

7. In combination, a crank chamber, a crank shaft having a hollow crank pin, a valve seat arranged within said pin and communicating with a lubricant supply, a valve normally urged toward said seat and operable by the centrifugal force of the pin to recede from the seat and permit lubricant to flow into said chamber.

8. In combination, a crank casing, a crank shaft having a hollow crank pin, a plug sleeved within said pin and cooperating with the inner walls of the latter to form a lubricant receiving chamber, and means for transferring lubricant from said chamber into said casing including a centrifugally operated valve disposed within said plug.

9. In combination, a crank casing, a crank shaft having a hollow crank pin, a plug sleeved within said pin having a lubricant receiving chamber and a valve seat communicating therewith, a valve normally engageable with said seat and operable at a predetermined speed of the pin to permit lubricant within said chamber to escape into the casing.

10. In combination, a crank casing, a crank shaft having a hollow crank pin, a plug sleeved within said pin having a plurality of recesses therein cooperating with the inner walls of the pin to form lubricant receiving chambers, a valve seat within said plug communicating with said chambers, and a valve yieldably urged into engagement with said seat and operable at a predetermined speed of the shaft to recede from the seat and permit the lubricant to escape into said casing.

11. In combination, a crank casing, a crank shaft having a hollow crank pin, a plug sleeved within said pin and cooperating therewith to form a lubricant receiving chamber, said plug having a bore terminating in a valve seat adapted to communicate with the chamber aforesaid, a valve arranged within said bore and engageable with said seat, said valve being operable at a predetermined speed of the shaft to recede from its seat to permit lubricant to escape into said casing, yieldable means normally urging said valve against its seat, and means for adjusting said yieldable means whereby the speed at which said valve opens may be accurately determined.

12. In a radial type internal combustion engine, the combination with a crank chamber, of a crank shaft within said chamber, and means communicating with a lubricant supply operable at a predetermined speed of the shaft to spray lubricant outwardly toward the engine cylinders.

13. In an internal combustion engine, the combination with a crank case, of a crank shaft within the case and carrying a chamber communicating with a source of fluid supply and having an outlet opening, and means within the outlet opening operable in dependence upon the speed of rotation of the crank shaft for discharging lubricant from the chamber into the case.

14. In an internal combustion engine, the combination with a crank case, of a crank shaft within the case provided with a lubricant supply chamber having an outlet opening, means located within the outlet opening operable in dependence upon the speed of rotation of the shaft for discharging the lubricant from the chamber into the casing, and means for regulating the operation of the means aforesaid to provide for actuation of the latter at different crank shaft speeds.

In testimony whereof I affix my signature.

GLENN D. ANGLE.